May 7, 1957  J. R. FELIX  2,791,538
LIQUID-LIQUID CONTACTING APPARATUS
Filed Sept. 30, 1953  2 Sheets-Sheet 1
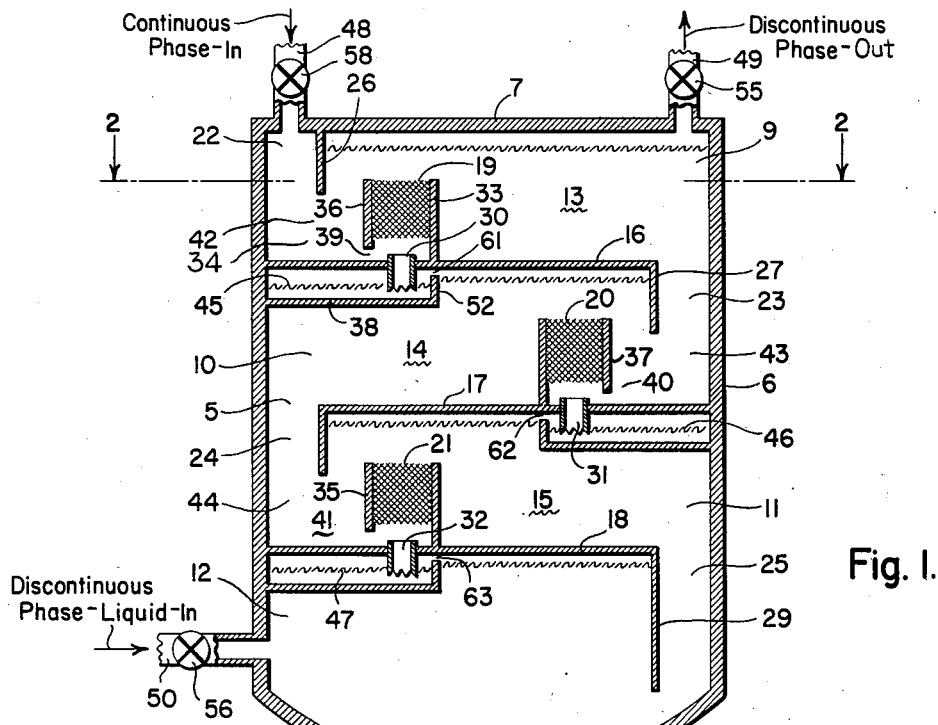
Fig. 1.
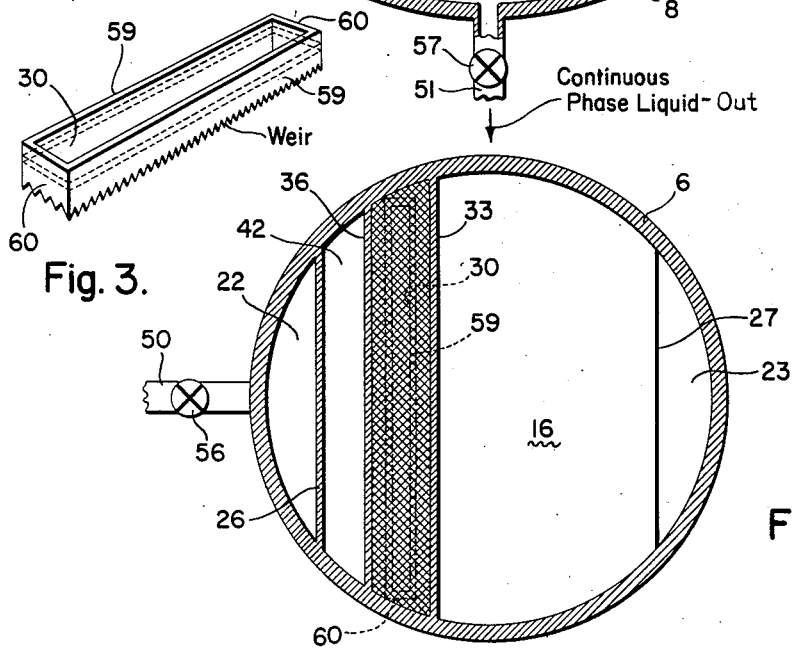
Fig. 3.
Fig. 2.
INVENTOR.
James R. Felix
BY
A. N. Wright ATTORNEY May 7, 1957  J. R. FELIX  2,791,538
LIQUID-LIQUID CONTACTING APPARATUS
Filed Sept. 30, 1953  2 Sheets-Sheet 2

INVENTOR.
James R. Felix
BY
W. N. Wright ATTORNEY

United States Patent Office 2,791,538
Patented May 7, 1957

2,791,538

LIQUID-LIQUID CONTACTING APPARATUS

James R. Felix, Plainfield, N. J., assignor to Esso Research and Engineering Company, a corporation of Delaware Application September 30, 1953, Serial No. 383,355

8 Claims. (Cl. 196—14.52)

The present invention relates to an improved apparatus for countercurrently contacting two incompletely miscible liquids having different densities. The invention has general application in the field of liquid-liquid extraction wherein one liquid is contacted with a second liquid for the purpose of removing desirable or undesirable constituents, as the case may be, from one of the liquids. It has particular application in those liquid-liquid-contacting processes in which one of the liquids is present throughout the contacting apparatus as a continuous phase, and the other liquid is present as a discontinuous liquid phase.

In accordance with the present invention, a novel contacting stage construction is employed in a vertical tower which is characterized by providing concurrent mixing and concurrent settling in each stage throughout the tower and countercurrent flow of the liquids between stages. The stages of the present apparatus or characterized by improved hydraulic stability, contacting efficiency, and capacity. They are particularly characterized by a high degree of hydraulic stability over a wide range of liquid flow rates and liquid physical properties.

The invention is directed broadly to processes in which liquids are treated by selective solvent action. At the present time there are a great many chemical processes in which a selective solvent is used to treat a particular liquid in order to secure a partial segregation or removal of chemical constituents from the liquid. For example, petroleum oils are conventionally treated with solvents such as liquid sulfur dioxide, phenol, cresol, nitrobenzene, furfural, aniline, ether and other solvents or mixture of such solvents. Contact of these solvents with a petroleum oil is particularly employed to remove low viscosity index constituents from the oil and thereby obtain a treated oil having an improved viscosity index. More generally, such solvent treating processes are employed to selectively remove undesired constituents from the liquid being treated or in some cases to recover desired constituents.

In solvent treating operations of the general character above described, many modifications of a process nature are often used to control the solvent extraction as desired—for example, auxiliary solvents or modifying agents may be injected into the treating system. Again a wide range of temperature and pressure conditions may be employed in particular types of solvent extractions. The present invention, however, is not concerned with these types of modifications of refinements. Instead, it is concerned with a basic apparatus that may be used for contacting liquids whatever the particular system may be. It is, therefore, to be understood that this invention is of application to any liquid-liquid contacting system with any of the modifications that may be employed in such processes.

In analyzing the necessary mechanism required in liquid-liquid contacting processes it is apparent that certain basic effects are required. First it is necessary that the two liquid phases be intimately and completely dispersed so that they come into very intimate contact with one another. Second, the resulting mixture of the two liquid phases must be then thoroughly separated in order to recover the two phases. The first of these steps requires the use of mixing equipment which is capable of intimately dispersing the discontinuous phase liquid through the continuous phase liquid. The second step requires the use of large settling zones or mechanical devices which are capable of separating the mixtures that have been formed by the mixing portions of the apparatus.

It will be appreciated that a complete transfer of one or more components from one of the liquid phases into the other liquid phase cannot generally be realized in one mixing and settling operation. For this reason, it is generally necessary to employ forms of mixing apparatus which contain a plurality of contacting stages. Each stage of such an apparatus is comprised of a mixing zone and a settling zone. Generally speaking, the two liquids entering a particular stage in a multi-stage contacting apparatus are first thoroughly admixed and then are thoroughly separated. The separated liquids are then passed to subsequent contacting stages for further treating until the desired degree of component transfer between the two liquids has been realized.

A wide variety of processes and forms of apparatus are presently employed for contacting one liquid with another liquid. Likewise, a wide variety of flow patterns through each form of apparatus have been used with varying degrees of success. In general, it has been found to be advantageous to effect large volume fluid treating in multi-stage contacting towers rather than in mixers and settlers, centrifuges, and so forth. Processing in towers is more advantageous from the economic point of view because of the lower initial and operating costs. Consequently, considerable attention has been given to the development of apparatus that will provide efficient liquid-liquid contacting in tower forms of contacting apparatus. The towers which have been employed and which are presently employed vary widely in their designs. For example, some employ various types of packing materials; others employ perforated plates; and still others employ a wide variety of internal baffles, plates and the like.

One of the most popular contacting towers employed to date is a multi-stage tower wherein the stages are vertically superposed one upon the other and are separated by horizontal, perforated metal plates. In this type of tower one of the liquids enters the top of the tower, flows down the tower and finally leaves through the bottom of the tower. The second liquid enters the bottom of the tower and after flowing up within the tower leaves through the top of the tower. In other words, the overall flow relationship between the two liquids in the tower is a countercurrent one.

Sets of perforations in the horizontal plates that separate the stages in the tower allow one of the two liquids to pass from plate to plate through the tower. Similarly, downcomers or other sets of perforations are provided to convey the second liquid from one plate to another. The downcomers and/or the sets of perforations that are associated with the plates are generally positioned so as to provide horizontal flow of one or both of the liquids across the various plates and thereby induce more complete contacting between the liquids and a closer approach to equilibrium mass transfer. Thus, it is general practice to position the downcomers and/or the sets of perforations of successive plates on diametrically opposite sides of the tower.

While the perforated-plate type of contacting tower has permitted the realization of some improvements in the field of liquid-liquid extraction, this form of apparatus still lacks a number of desirable features. In the first place, towers employing perforated plates generally lack flexibility in that they usually must be carefully designed for the particular liquids and operating conditions that it has been decided to employ in any given case. In this connection, the size of the perforations is generally a particularly critical feature in the design of the individual plates, since the perforations not only serve to disperse or jet the one liquid into the other liquid but also to maintain a layer of liquid adjacent each plate thereby preventing by-passing of the liquid or liquids around the plates. It is readily apparent and it has been found in actual practice that relatively small upsets in the operation of a perforated plate tower will cause the sealing layers of liquid to disappear with resulting by-passing of the plates.

A second disadvantage associated with perforated plates lies in the fact that such plates are generally characterized by plate efficiencies generally less than about 50%. The low efficiencies result primarily from incomplete contacting of the two liquid phases in the region of phase mixing and also from the short time of actual contact between the phases during mixing.

At this point it is well to point out that the term plate efficiency (or stage efficiency) as used herein is considered to mean the percentage of the degree of contacting that is realized between two liquids in a given plate or stage as compared to the equilibrium degree of contacting that is realized between the same liquids in a single stage batch mixer and settler. Thus, one theoretical stage is established by contacting two liquids intimately to equilibrium in a batch mixer followed by a thorough and complete settling in a batch settler. As stated, therefore, conventional perforated plate liquid contacting towers, due to their plate efficiencies of about 50% maximum, substantially require a number of plates exceeding by about a factor of 2 the number of theoretical stages of contacting that would be required for a given liquid-liquid system. Other conventional contacting towers for the most part possess contacting efficiencies of the same order of magnitude as perforated plate type towers. It is clearly of the greatest importance therefore to improve the plate efficiency (or stage efficiency) of multi-stage towers in order to decrease the expense of contacting and also to decrease the size of the towers.

A third failing of perforated-plate type contacting plates lies in the fact that such plates utilize for actual mixing purposes only a relatively small percentage of the total energy that is available in contacting towers and that could be used for this purpose. The energy available for this purpose is to a great extent the energy resulting from the difference in the specific gravities of the two liquids being contacted in the apparatus. In other words, there is a buoyant energy available in the column as a result of the fact that the one liquid has a lower specific gravity than the other liquid. In spite of the fact that this energy is readily available, the perforated plate towers as well as other conventional towers have been able to utilize only a relatively small proportion of the energy for the purpose of mixing the two liquids at each stage within the towers. It is considered that the balance of available energy is dissipated in aimless swirling which takes place as the dispersed phase passes through the continuous phase. Such uncontrolled swirling is relatively ineffective in providing desirable mixing. Furthermore, almost all dispersion plates have fixed dispersion areas, and the pressure drops through the perforations in the plates therefore vary with the scale of the flow rates and the physical properties of the dispersed phase through the perforations. This feature results in definite limitations on the flexibility of towers of this type with regard to both operating efficiency and hydraulic stability.

Accordingly, it has been an object of those skilled in the art to improve upon the contacting efficiency, hydraulic stability and flexibility of the various types of contacting towers that are employed at the present time. In line with these objectives a multi-stage tower has recently been proposed in which each of the individual stages consists of a separate mixing zone and a separate settling zone. The continuous phase liquid and the discontinuous phase liquid in each stage are passed concurrently through a substantially vertically disposed laterally confined mixing zone and then are passed concurrently through a horizontally disposed settling zone. Thus, each stage in the contacting tower is characterized by concurrent flow of the two liquid phases even though the overall flow relationship between the phases in the tower is countercurrent.

In this recently suggested multi-stage tower each of the mixing zones may be provided with any one of a number of conventional mixing devices. Suitable mixing means include packing materials, such as Berl saddles, Raschig rings, wire mesh, crinkled wire mesh, and finely divided solids. Other mixing means include mechanical devices such as propeller mixers, paddles, etc., and especially vibrating plate mixers of the type described in pending patent application Serial No. 75,904, filed February 11, 1949, by Fenske et al., now U. S. Patent 2,667,407. The choice of the particular mixing device may vary considerably depending upon the types of liquids and the types of operations that are desired to be employed in any given tower.

Particularly attractive features of this recently proposed multi-stage type of tower include (1) the use of a self-adjusting means for automatically maintaining a liquid seal on each plate and (2) a weir for distributing the discontinuous phase liquid uniformly throughout the continuous phase liquid as the two liquids merge and enter the mixing zone of each stage. The first-named feature represents a valuable advance over the perforated plate tower and other conventional types of contacting towers in that it provides a tower with a higher degree of hydraulic stability than was previously possible.

The present invention constitutes a further improvement on the recently proposed multi-stage type of contacting tower that has just been briefly described. The present invention is particularly concerned with providing such a tower with an even greater degree of hydraulic stability than has been considered possible heretofore. The present invention and the particular advantages that flow from it may be best understood by referring to the attached figures which illustrate several embodiments of the same.

Figure 1 is an elevational cross-section view of a three-stage contacting tower containing the features of the present invention and adapted to process a liquid-liquid system in which the continuous phase liquid is the heavier of the two liquids.

Figure 2 is a transverse view of the tower depicted in Figure 1 taken along the axis 2—2 in Figure 1.

Figure 3 is an isometric projection of a riser conduit and weir that may be employed in the apparatus shown in Figures 1 and 2.

Figure 4:
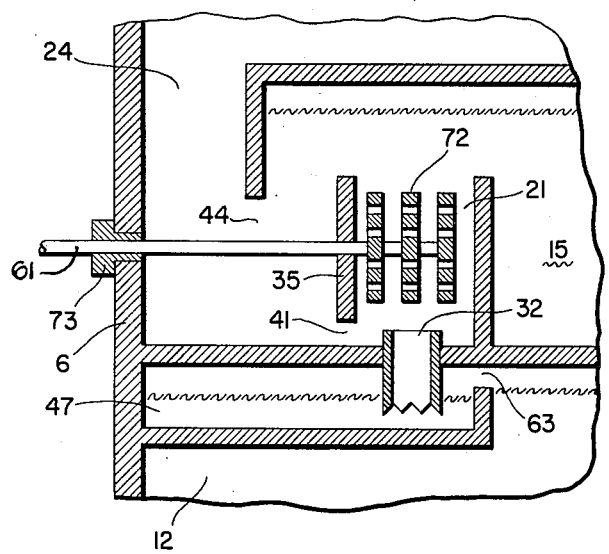
Figure 4 illustrates a particular type of a mixing zone and mixing apparatus that may be employed in connection with the present invention. The various parts in this figure that correspond to equivalent parts in Figure 1 are identified by the same numerals as are employed in Figure 1.

Referring to Figure 1, it will be noted that the apparatus shown therein comprises an elongated cylindrical vertical vessel 5 which contains side walls 6, a top plate 7 and a bottom plate 8. The vessel is divided vertically into three contacting stages 9, 10 and 11 by substantially horizontal imperforate plates 16, 17 and 18. Each contacting stage is divided in turn into a mixing zone and a settling zone by a vertically disposed, imperforate plate.

Thus, stage 9 is divided into a mixing zone 42 and a settling zone 13 by vertical plate 33 which is sealed to plate 16 and which terminates vertically in spaced relation with top plate 7. In a similar manner, stage 10 comprises a mixing zone 40 and a settling zone 14, and stage 11 is made up of a mixing zone 41 and a settling zone 15. The mixing zones 42, 40 and 41 in turn are laterally divided in a manner to be described later herein into two mixing sections 19 and 34, 20 and 43, and 21 and 44 respectively.

Each contacting stage is further provided with a downcomer for conveying continuous phase liquid from an adjacent stage or a point outside the vessel proper to the mixing zone of the stage. Thus, stage 9 contains a vertical conduit 22 which is formed by the walls 6 of vessel 5 and vertical plate 26 and which is adapted to convey continuous phase liquid as by gravity flow from outside vessel 5 into contacting stage 9. Similarly, stage 10 is provided with downcomer conduit 23 which serves to convey continuous phase liquid from settling zone 13 of stage 9 to mixing zone 40 of stage 10. It will be further noted, of course, that downcomer conduit 23 is in diametrically opposite relation to downcomer conduit 22 with respect to its position within vessel 5 proper. Thus, the continuous phase liquid in passing from stage to stage throughout vessel 5 flows in horizontally opposite directions through the settling zones of successive stages.

Each contacting stage is also provided with a riser conduit which serves to convey discontinuous phase liquid to the mixing zone contained in the stage from the layer of discontinuous phase liquid that exists immediately below the bottom plate of the stage. Thus, stages 9, 10 and 11 are provided with riser conduits 30, 31 and 32 respectively. Referring specifically to conduit 30, it will be noted that this conduit is substantially vertically disposed and extends beyond plate 16 in both vertical directions. The upper edge of conduit 30 is spaced vertically from plate 16 in order to prevent discontinuous phase liquid from wetting the top surface of plate 16 and then flowing along the surface of the plate rather than vertically upward into the mixing section 19.

The upper edge of conduit 30 is also spaced from the bed of packing material shown in mixing section 19 of zone 42 since it has been found that such a spaced relationship causes the discontinuous phase liquid to form a thin layer on the bottom surface of the bed as it impinges thereon. This thin layer of discontinuous phase liquid greatly increases the mixing efficiency of the bed by giving more uniform distribution of the discontinuous phase liquid within the continuous phase liquid in the packing. A particularly preferred spacing between conduit 30 and the bed in the mixing section 19 is a distance of some 2" to 10" and especially 4" to 6". This spacing, of course, need not be observed when no packing is employed, or alternatively when the mixing means is a mechanical device.

The lower edge of conduit 30 terminates in a trap chamber 45 which is made up in Figure 1 of horizontal plate 38 and vertical plate 52 in combination with a portion of the underside of plate 16. Plate 52 terminates vertically in a spaced relation with the underside of plate 16 and vertically intermediate plate 16 and the lower edge of conduit 30. Thus, a conduit or liquid passageway 61 is provided in chamber 45 which serves to convey discontinuous phase liquid from settling zone 14 into trap chamber 45. It is apparent that the relationship between the lower edge of conduit 30 and conduit 61 provides a liquid trap which in combination with vertical plate 27 serves to trap a layer of discontinuous phase liquid along the underside surface of plate 16. The structural relationship of these various elements also automatically maintains this liquid layer over a wide range of liquid flow rates and general operating conditions.

The lower edge of conduit 30 serves as a peripheral-type weir for the flow of discontinuous phase liquid from within trap chamber 45 through conduit 30 and thence into mixing section 19 of mixing zone 42 in stage 9. The lower edge of conduit 30 may be smooth and therefore in a sense constitute a peripheral type of straight edge weir. It is preferred, however, that the lower edge of the conduit be serrated to form a notched type weir as for example a V-notch weir, a trapezoidal weir, a rectangular weir, etc. A particularly preferred type of notched weir is a V-notch weir in which the notches are wide enough and deep enough to accommodate both the largest and the smallest expected flow rates of the discontinuous phase liquid.

In accordance with the present invention as described briefly above, the mixing zone of each contacting stage is divided into two laterally juxtaposed mixing sections. Thus, mixing zone 42, in accordance with the present invention, is divided laterally by vertical plate 36 into two mixing sections 19 and 34, which may be referred to conveniently as an initial mixing section and a recycle mixing section respectively, as will become evident when the specific functions of those sections are considered. In addition, downcomer conduit 22 is preferably terminated vertically at a point vertically intermediate the upper and lower extremities of plate 36. This construction varies from previously proposed contacting stages in that the downcomer conduits of the previous stages extended vertically to a point at least even with the lower edge of plate 36. Furthermore, it was the practice in previous stage designs to make plates 26 and 36 one continuous plate that formed one continuous conduit which extended from the upper surface of the stage substantially to the entrance of the mixing zone. In the present apparatus, downcomer 22 essentially is split vertically and the lower portion of the downcomer then moved inwardly toward a central portion of the stage. It is preferred, however, that the lower edge of plate 26 terminate slightly below the upper edge of plate 36.

The advantages flowing from the use of this so-called "split downcomer" are several. First, the hydraulic stability of the apparatus is improved, since the hydraulic unbalance existing within the overall contacting vessel is never greater than the unbalance occasioned by one mixing zone. Heretofore, the unbalance within a contacting vessel of the general type described herein never was less than the unbalance occasioned by at least two mixing zones. Referring specifically to Figure 1 and momentarily considering plates 26 and 36 in stage 9 to be one integral plate and plates 27 and 37 in stage 10 to be one integral plate, it will be seen that a hydraulic unbalance is generated by virtue of the fact that a mixed phase of the two liquid phases exists in the mixing zones in each of the stages. These two mixed phases have a lower specific gravity than the column of continuous phase liquid existing below the phase interface in settling zone 13 and extending into the downcomer conduit 23. Conduit 23 would now of course extend to the entrance of the mixing zone in stage 10. It is apparent that this unbalance would be very substantial in most instances and that conduit 61 would have to be positioned well above the lower edge of conduit 30 in order to maintain a continuous seal on the layer of liquid below plate 16. The actual distance between conduit 61 and the lower edge of conduit 30 may be as much as 18" or more in most commercial towers.

In accordance with the present invention which utilizes a laterally split mixing zone and a vertically split downcomer it will be seen that the hydraulic unbalance is now restricted to the unbalance occasioned by merely one mixing zone. Thus, the mixed phase existing within mixing section 19 is now balanced against merely the height of continuous phase liquid that exists within the settling zone 13 below the phase interface contained therein. This is so since there is direct communication between continuous phase liquid below the interface under plate 16 and that in downcomer 23. The hydraulic unbalance is therefore unaffected by the mixing zone in stage 10.

The reduction in the amount of hydraulic unbalance existing within the present apparatus has the very desirable result of decreasing the height of each stage and also the height of the overall contacting vessel. Referring specifically to stage 9 of the apparatus in Figure 1, it will be observed that the reduced height of this stage is made possible by virtue of the fact that the lower edge of conduit 30 may now be positioned much nearer vertically to conduit 61 without endangering the hydraulic stability within this stage. Thus, in actual practice it has been observed that the height of an individual stage of the present type may be no more than ½ to ¾ the height of a previously conventional stage.

Insofar as the physical construction of the present apparatus is concerned, it will be appreciated that certain general principles must be observed in constructing any embodiment of the present invention. Thus, the settling zone in each contacting stage must be large enough in volume to provide a continuous phase retention time long enough for discontinuous phase settling. This volume is fixed by the settling time of the liquid-liquid system and the continuous phase liquid flow rate. Thus, the quotient of rate into necessary volume should be at least equal to the measured settling time. For fixed tray spacing, the settling zone area is then readily found. This will vary from system to system. So a settling zone area for a tower to operate on a variety of systems (for example, various oils with phenol) becomes a design balance between tower cost and estimated efficiency loss if poor settling is gotten.

Similarly, the mixing zone size in a given tower will be fixed by a balance between reduction in settling zone volume (for a given tower) and increase in efficiency or between efficiency and tower size. As the mixing zone is made larger, the holding time of mixed phase in it is increased which increases efficiency. Alternatively, this increase cuts down on the settling zone volume so that settling is poorer. A minimum size of mixing zone is fixed by the pressure drop through it, because if the pressure drop becomes too large, the stage is unstable. These general considerations are well known to those skilled in the art, and a more detailed discussion of them is felt to be unnecessary for the purposes of the present description.

Referring specifically to stage 9 in Figure 1 for construction details that are vital to the present invention, it will be observed that the upper edge or end of initial mixing section 19 should preferably terminate vertically below the interface that exists between the two liquid phases in settling zone 13. It is particularly preferred that the upper end of mixing section 19 terminate about 1 to 8 inches in most cases from this phase interface.

The recycle mixing section 34 of mixing zone 42 in stage 9 comprises the space below conduit 22 and also the space that lies laterally between this conduit and plate 36 of initial mixing section 19. The volume and physical dimensions of the portion of mixing section 34 that lies vertically beneath conduit 22 are fixed by the dimensions of the overall stage and the dimensions of conduit 22. The lateral dimension of the portion of mixing section 34 that lies laterally between plate 26 and plate 36 is determined by pressure drop considerations and also by the amount of recirculation that it is desired to have between the upper or outlet end of mixing section 19 and the lower or inlet end of this same section. In most cases the lateral distance from plate 26 to 36 should be from ¼ to 1 times the lateral distance from plate 36 to plate 33, and especially about ½ the distance.

As mentioned earlier herein, the present mixing zone design causes at least a part of the continuous phase liquid issuing from mixing section 19 to flow vertically downward between plate 26 and plate 36. This stream of continuous phase liquid contains a considerable portion of discontinuous phase liquid entrapped within it and it is therefore lighter in specific gravity than the continuous phase liquid issuing forth from downcomer conduit 22. However, as the two streams intermingle and mix within mixing section 34, a mixture of discontinuous phase liquid and continuous phase liquid is formed which has a much higher specific gravity than does the liquid that originally issued from the exit end of mixing section 19. Due to this differential in specific gravity, a recirculation system is thereby set up in which continuous phase liquid as well as some discontinuous phase liquid is continuously recycled from the exit end of mixing section 19 to the entrance end of this section. The advantages realized from this type of stage construction include (1) increased contacting efficiency within each stage due to the fact that the time of contact between the two liquid phases is greatly increased by the recirculation procedure, (2) contacting efficiency is further increased by virtue of the fact that a substantial portion of the contacting stage that was previously occupied by the downcomer conduits is now utilized for additional mixing zone capacity, (3) the liquids within the settling zone are maintained in a very quiescent condition thereby making for efficient settling and separation of the mixture from the mixing zone, and (4) the hydraulic unbalance described earlier is further reduced since the recirculating continuous phase increases the effective specific gravity of the mixed phases in mixing section 19 which in turn reduces the specific gravity differential between this liquid and the continuous phase liquid in settling zone 13.

Figure 3 illustrates in isometric projection the riser conduit and weir member 30 shown in Figures 1 and 2. As may be seen, this member is rectangular in that it consists of two long sides 59 and two short sides 60. The entire lower peripheral edge is serrated to provide a V-notch weir.

Figure 4 illustrates how the present invention may be applied to forms of contacting apparatus in which the mixing zones of the apparatus are provided with mechanical mixing devices. The specific device shown in Figure 4 is a perforated plate mixer of a type described and referred to earlier in this description. As illustrated, the perforated plate mixer is made up of a plurality of parallel, perforated plates 72 that are mounted upon and supported by a rod 61. Rod 61 pierces plate 35 and is slideably mounted therein. This rod then continues through the wall 6 of the contacting vessel and a suitable packing gland or seal 73 mounted therein.

Rod 61 is depicted as being supplied with a reciprocating type of motion adapted to vibrate the plates 72 in the manner desired. The power source for this purpose may be any conventional electrical, hydraulic, pneumatic or other type of motor capable of imparting a reciprocating motion to the rod. Thus, a reciprocating steam engine or a solenoid-type of device may be employed. In any case, the flat surfaces of the plates 72 are caused to reciprocate in a direction that is substantially normal or perpendicular to the direction of liquid flow through the mixing section 21. It will be noted that a variable speed and variable stroke drive may be used to very closely control the degree of mixing that is desired in any given case.

Figure 5:
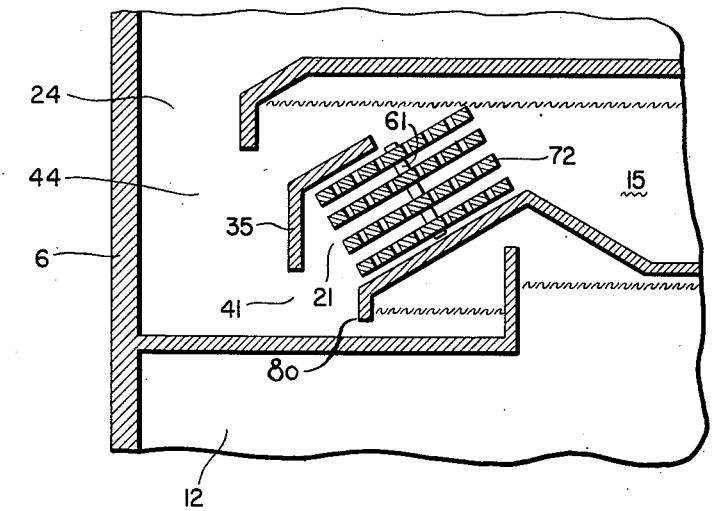
Figure 5 illustrates another type of mixing zone and mixing apparatus that may be employed in connection with the present invention. Again, the parts in this figure that have their counterparts in stage 11 of Figure 1 are identified by the same numerals in each instance.

Figure 5 illustrates still another embodiment of the present invention wherein the mixing section is tilted very substantially from the vertical. The mixing device and the tilted mixing section shown there have been previously suggested but not with the incorporation of the shortened downcomer conduit and the additional mixing zone volume that are advocated in the present description. Referring to Figure 5 it will be observed that the downcomer 24 terminates vertically below the upper edge of bent baffle plate 35. In addition, plate 35 is spaced laterally inward from the bottom of conduit 24 to form the additional recycle mixing section volume called for by the present invention. Thus, while the apparatus in Figure 5 at first appears to be different from the mixing zones illustrated in Figure 5 and Figure 1, it will be recognized that the critical design features of the present invention are equally present in all three types of designs. It will be particularly noted, however, in Figure 5 that the weir employed to distribute the discontinuous phase liquid through the continuous phase liquid as both streams enter the mixing section 21 is a true straight edge type of weir rather than a peripheral type of weir. The weir in Figure 5 is designated by the numeral 80. This weir is preferably notched in a manner described earlier herein.

The present invention may be even better understood by briefly considering the manner in which the apparatus shown in Figure 1 operates when two liquids are actually passed through the apparatus. Accordingly, it will be assumed that it is desired to contact mineral oil and phenol in the apparatus of Figure 1. It will further be assumed that the phenol, which is the heavier of the two liquids, constitutes the continuous phase throughout the apparatus; and that the oil constitutes the discontinuous phase. In starting up such a contacting operation it will be further assumed that the entire contacting vessel is first completely filled with phenol. Thus, phenol may be introduced within vessel 5 by flowing through conduit 48 and valve 58 until the vessel is entirely filled with phenol. The vessel may be vented through conduit 49 and valve 55 during this phase of the operation. Once vessel 5 is completely filled with phenol, valve 57 may be manually or automatically opened to allow phenol to flow from vessel 5 at substantially the same rate as it enters the vessel. At this point oil may be introduced within vessel 5 via conduit 50 and valve 56. The oil being lighter than the phenol rises within section 12 and collects under plate 18.

It will be noted that the oil layer under plate 18 extends from vertical plate 29 entirely throughout the vessel including trap chamber 47. It will further be noted that, as the oil layer collects under plate 18 and especially within trap chamber 47, phenol is displaced from beneath plate 18 through riser conduit 32. When the oil layer has built up to the point where the interface between the oil and the phenol is at the same level as the lower end of conduit 32, oil flows over (e. g. under the lower edge of) conduit 32 and then flows vertically upward into mixing section 21. As pointed out earlier, the lower edge of riser conduit 32 behaves as a weir over which the oil must flow before entering the conduit. And in this connection it will be noted that for the lower edge of conduit 32 to behave as a true weir and not as a mere baffle, a layer of phenol must always exist in chamber 47.

Once oil enters mixing section 21 it is admixed with phenol that is already in this section. The resulting mixture of oil and phenol, having a lower specific gravity than the phenol alone, causes a hydraulic unbalance to be set up within stage 11. This hydraulic unbalance coupled with the buoyancy of the oil layer positioned below plate 18 supplies the energy required for mixing the two liquids within mixing section 21. These two sources of energy also assist in overcoming the pressure drops that are generated by the liquids in flowing through each of the stages.

The oil and phenol mixture leaving mixing section 21 flows partially into settling zone 15 and partially into mixing section 44. The portion flowing into settling zone 15 is separated into (1) an oil layer that collects under plate 17 and (2) a phenol layer that leaves this zone via downcomer conduit 25. The remaining portion which flows into mixing section 44 mingles with phenol entering this section via conduit 24 and is recirculated to mixing section 21 by means of the conduit that is defined by the top of plate 18 and the lower edge of plate 35.

The oil that collects under plate 17 continues up through vessel 5 in the same manner as it passed through stage 11. For example, it flows through conduit 62 into trap chamber 46 and thence over the weir at the lower edge of conduit 31 and upward through conduit 31 into mixing section 20. It is again mixed with phenol in mixing section 20. As in stage 11, a portion of the oil-phenol mixture from section 20 is settled in settling zone 14 while another portion is recirculated to mixing section 20 by passing vertically downward through mixing section 43 and thence into the entrance of section 20. The oil in settling zone 14 rises and collects under plate 16, while the phenol sinks and eventually flows through downcomer 24 into stage 11.

The oil under plate 16 flows through conduit 61 into trap chamber 45 and then through conduit 30 into mixing section 19. Here again part of the mixture formed within section 19 is recirculated to this section, while another portion is discharged into settling zone 13. The portion discharged into zone 13 separates into two distinct layers—an oil layer under plate 7 and a phenol layer above plate 16. The latter flows vertically downward through conduit 23 into stage 10. The former or oil layer leaves the contacting vessel by means of conduit 49 and valve 55. Valve 55, in this connection, may be manually operated or it may be operated in response to a suitable controller. Such techniques and automatic valve arrangements are well known in the art and it is considered therefore that a detailed description of such valves and instruments is not required in the present instance.

It will be understood that the foregoing description has been concerned with merely one embodiment of the present invention. It is apparent that many structural modifications and variations may be incorporated within the apparatus described above without departing from the spirit or scope of the present invention. For example, the contacting vessel proper as well as the downcomer conduits and the riser conduits may take on geometric forms other than those described. For example, the contacting vessel may be made rectangular or square in cross-section, and similarly, the riser conduits may be square, rectangular or circular. Furthermore, a plurality of riser conduits rather than a single conduit may be employed. Indeed it is preferred that a plurality of small, square or rectangular riser conduits be used in place of the single elongated rectangular conduit shown in Figures 1, 2 and 3.

In some instances it may be also desirable to tilt plates 16, 17 and 18 slightly from the horizontal in order to promote the flow of liquids across these plates. It may also be desirable to bevel or otherwise curve the intersections that are formed between these plates and the downcomer conduits extending from them to succeeding stages in the contacting tower. Again, the physical dimensions of the settling zones, the mixing zones and other portions of the tower may be varied if necessary to meet the hydraulic or volume demands of any given liquid-liquid system or operation.

Referring again to plates 16, 17 and 18, it will be appreciated that these plates need not always be perfectly flat. It will also be appreciated that by slight structural modifications, portions of these plates may constitute either the top plate or the bottom plate of the trap chambers associated with them.

It will be understood that the present apparatus may be also adapted to a liquid-liquid system in which the continuous phase liquid is the lighter of the two liquids. In this case the contacting tower shown in Figure 1 need merely be vertically inverted, for in either vertical position the continuous phase liquid will continue to flow through the same inlet and outlet connections and also the same downcomer conduits, etc. Similarly, the discontinuous phase liquid will flow through the same inlet and outlet connections in either case, and also through the liquid trap chambers and riser conduits.

The present apparatus may also be applied to a wide variety of liquid-liquid systems and processes other than the phenol-and-oil system and extraction process described earlier. Thus, in the petroleum industry alone it may be adapted for use in such processes as acid treating, caustic treating, solvent extraction, sweetening and the like. Furthermore, the present apparatus may be employed in combination with any pumps, heaters, flow instruments, valves or other devices that are conventionally employed with liquid-liquid contacting towers by those skilled in the art. Similarly, phase modifiers, diluents, demulsifiers, settling aids and other materials or techniques that are conventionally employed in liquid-liquid operations may be incorporated within the processes that utilize the apparatus of the present invention.

To better understand the present invention, reference is made to the following example which illustrates an embodiment of the same. The data in the example are based on runs in which phenol was contacted with an SAE-10 type of mineral oil in a single stage extractor very similar in construction to the apparatus illustrated in Figure 1. This stage was 20" high, 30" wide and 4" deep. The settling zone proper constituted about 23 inches of the width of the stage and was situated toward one side of the stage. The mixing zone was about 5–6 inches wide and 4 inches deep and was positioned laterally alongside the entrance to the settling zone.

The mixing zone was divided laterally into a mixing section and a recycle section, the former section being between the settling zone and the recycle section. The mixing section was about 4 inches wide, 4 inches deep and about 12–13 inches high. The upper 9 inches of the mixing section was kept devoid of any mixing aid in some runs and in other runs was filled with crinkled wire mesh.

The riser conduit in the bottom of the mixing section was about 2 inches in diameter and 1¼" long. The bottom or upstream edge was provided with 16 V-notches ⅜" wide x ¾" deep.

The recycle section was about 1–2 inches wide and lay laterally intermediate the mixing section and the downcomer conduit that supplied phenol to the stage.

The temperature in the stage was maintained at about 140–145° F., and 1 volume of phenol per volume of oil was used in each run. The oil was presaturated with phenol to avoid the occurrence of saturation within the stage. The data obtained are presented in the following table:

| Run No. | 1 | 2 | 3 | 4 |
| --- | --- | --- | --- | --- |
| Crinkled Wire Mesh in Mixing Zone | No | No | Yes | Yes |
| Oil Rate, G. P. H. | 25 | 83 | 25 | 79 |
| Efficiency, percent | 79 | 90 | 95 | 93 |

As may be seen in the above table the apparatus of the present invention is capable of operating at very high levels of contacting efficiency. It is also apparent that the use of a mixing aid in the mixing section is desirable since higher efficiencies may be thereby realized.

What is claimed is:
1. In a multi-stage tower for countercurrently contacting two incompetely miscible liquids having different specific gravities wherein one of the liquids is present as a continuous liquid phase and the other as a discontinuous liquid phase, an improved contacting stage which comprises an upper limiting surface and a lower limiting surface, side walls, and two laterally opposite end walls; a first vertically disposed plate disposed interiorly of said contacting stage dividing the stage laterally into a mixing zone intermediate said first plate and a first of said end walls and a settling zone intermediate said first plate and the second of said end walls; said first plate being sealed to a first of said limiting surfaces and in spaced relation with the second of said surfaces; said settling zone being adapted to separate mixtures of said two liquids into separate phases; the settled discontinuous phase being adjacent said second surface and the settled continuous phase being adjacent said first surface; a second substantially vertical plate laterally intermediate said first plate and said first end wall and vertically intermediate and spaced from said upper and lower limiting surfaces whereby said mixing zone is divided into two laterally juxtaposed mixing sections; said mixing sections including a recycle mixing section intermediate said second vertical plate and said first end wall and an initial mixing section intermediate said first and second vertical plates; a first vertically disposed conduit disposed within said recycle mixing section piercing said second surface and terminating vertically intermediate the vertical extremities of said second vertical plate whereby said continuous phase liquid is introduced within said stage; conduit means providing flow of said discontinuous phase liquid through said first limiting surface into said initial mixing section from a layer of discontinuous phase liquid adjacent said first limiting surface; a trap in said conduit means maintaining said layer of discontinuous phase liquid adjacent said first limiting surface; and a weir in said trap to distribute said discontinuous phase liquid substantially evenly across the cross-section of said initial mixing section.

2. Apparatus as defined in claim 1 in which the weir is a peripheral-type weir.

3. Apparatus as defined in claim 2 in which the weir is a notched weir.

4. Apparatus as defined in claim 3 in which the weir is a V-notch weir.

5. Apparatus as defined in claim 1 in which the initial mixing section is provided with mechanical mixing means.

6. Apparatus as defined in claim 1 in which the initial mixing section is provided with a bed of packing adapted for the contacting of liquids.

7. An apparatus for countercurrently contacting two incompletely miscible liquids having different specific gravities wherein one of the liquids is present as a continuous phase and the other liquid as a discontinuous phase and wherein the heavier of the liquids is introduced at the top of the apparatus which comprises a vertically disposed tower; a plurality of horizontally disposed, vertically spaced, imperforate plates dividing said tower into a plurality of superposed treating stages; first conduit means at a first end of said tower for introducing the continuous phase liquid within the tower; second conduit means for removing the continuous phase liquid from the opposite end of the tower; third conduit means for introducing the discontinuous phase liquid within said opposite end of the tower; fourth conduit means for withdrawing the discontinuous phase liquid from said first end of the tower; a plurality of first vertically disposed conduits within said tower to convey the continuous phase liquid from stage to stage; successive first conduits being disposed laterally opposite one another within the tower; the upstream end of each said first conduit piercing and being substantially flush with a separate imperforate plate, the downstream end of each first conduit terminating in vertically spaced relation with the next adjacent imperforate plate; first baffle means in each treating stage arranged to divide the stage laterally into a vertically disposed mixing zone and a laterally disposed settling zone; the upstream end of each mixing zone being sealed from its respective settling zone and the downstream end of the mixing zone being in free communication with the settling zone; the mixing zone in each stage being laterally adjacent the first conduit which extends into the stage; second baffle means dividing each mixing zone laterally into a vertically disposed initial mixing section and a vertically disposed recycle mixing section; said recycle section being laterally intermediate its respective initial mixing section and the adjacent first conduit; a plurality of second conduits in said tower to convey the discontinuous phase liquid from stage to stage; each imperforate plate being pierced by a separate said second conduit; the downstream end of each second conduit terminating within the initial mixing section of a separate treating stage; the upstream end of each second conduit terminating in a trap chamber arranged to maintain a layer of discontinuous phase liquid in the next adjacent treating stage, and a weir in each said trap chamber arranged to distribute the discontinuous phase liquid uniformly across the entrance of each said initial mixing section.

8. An apparatus as defined in claim 7 in which each weir is a notched peripheral-type weir extending around the entire periphery of the upstream end of each said second conduit.

References Cited in the file of this patent
UNITED STATES PATENTS

| | | |
|---|---|---|
| 2,037,318 | Fenske et al. | Apr. 14, 1936 |
| 2,290,209 | Rosenthal | July 21, 1942 |
| 2,520,391 | Findlay | Aug. 29, 1950 |
| 2,667,407 | Fenske et al. | Jan. 26, 1954 |